United States Patent [19]
Fischer et al.

[11] 3,813,098

[45] *May 28, 1974

[54] PRESTRESSED ELEMENTS

[76] Inventors: Herbert Corliss Fischer; Herbert Corliss Fischer, Jr., both of 3 Sawyer Rd., Wellesley, Mass. 02181

[ * ] Notice: The portion of the term of this patent subsequent to Oct. 13, 1987, has been disclaimed.

[22] Filed: July 7, 1971

[21] Appl. No.: 160,322

Related U.S. Application Data

[60] Division of Ser. No. 48,165, June 22, 1970, Pat. No. 3,631,897, which is a continuation-in-part of Ser. No. 856,901, Sept. 4, 1969, Pat. No. 3,533,203, which is a continuation of Ser. No. 617,583, Feb. 21, 1967, abandoned, which is a continuation-in-part of Ser. Nos. 388,416, Aug. 10, 1964, Pat. No. 3,208,838, and Ser. No. 464,309, June 10, 1965, Pat. No. 3,431,687, and Ser. No. 567,540, July 25, 1966, abandoned.

[52] U.S. Cl. ............... 273/72 R, 52/727, 138/141, 138/176, 138/DIG. 5, 156/161, 156/162, 156/172, 161/175, 161/176, 242/7.21, 242/7.22, 273/67 A, 273/DIG. 6, 273/DIG. 7, 273/DIG. 9, 273/DIG. 12

[51] Int. Cl. .... A63b 59/06, A63b 59/14, F16l 9/14

[58] Field of Search ............ 52/724, 725, 727, 728; 156/161, 162, 172; 161/175, 176; 273/67 A, 67 R, 72 R; 138/141, 172, 176, DIG. 5; 242/7.21, 7.22

[56] References Cited

UNITED STATES PATENTS

| | | | |
|---|---|---|---|
| R26,314 | 11/1967 | Costopoulos | 273/82 |
| 3,458,194 | 7/1969 | Coles | 273/67 |
| 3,470,051 | 9/1969 | Meyer | 156/171 |
| 3,533,203 | 10/1970 | Fischer et al. | 52/223 |
| 3,598,410 | 8/1971 | Costopoulos | 273/82 |
| 3,607,510 | 9/1971 | Serafino et al. | 156/172 |
| 3,631,897 | 1/1972 | Fischer et al. | 138/141 |

*Primary Examiner*—Charles E. Van Horn
*Assistant Examiner*—Robert A. Dawson

[57] ABSTRACT

A stressed element having a relatively rigid, imcompressible body combined with one or more internal or external tensioning strands, each comprising a multiplicity of synthetic organic fibers such as nylon, polyester, polypropylene or the like, having a high recoverable stretch, the tensioning strands being maintained in intimate association with the rigid body and in highly elongated tensioned condition to compress the body and so stress the element.

11 Claims, 13 Drawing Figures

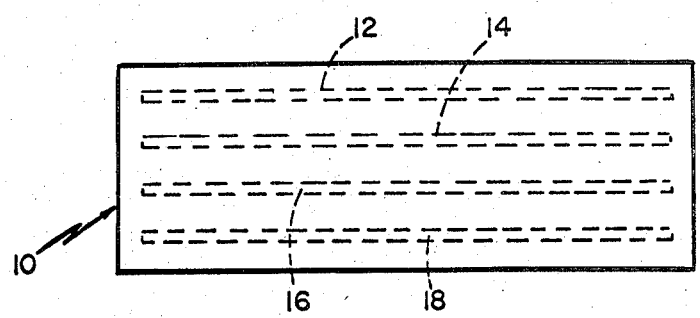
FIG 1
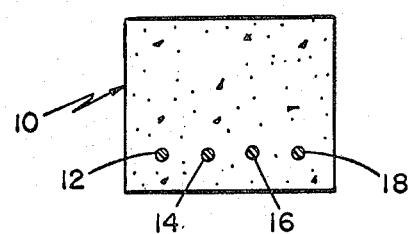
FIG 2
FIG 3
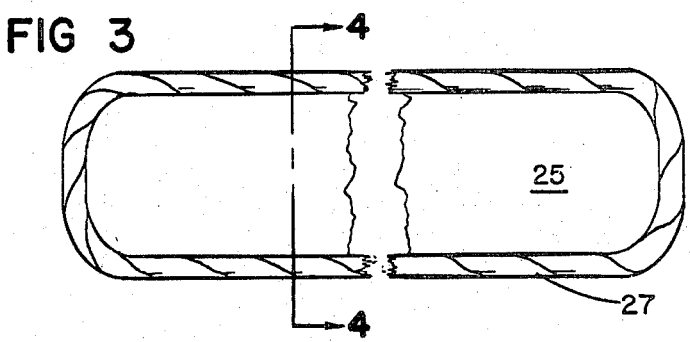
FIG 4
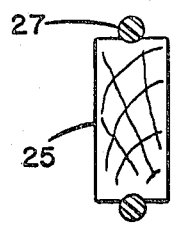
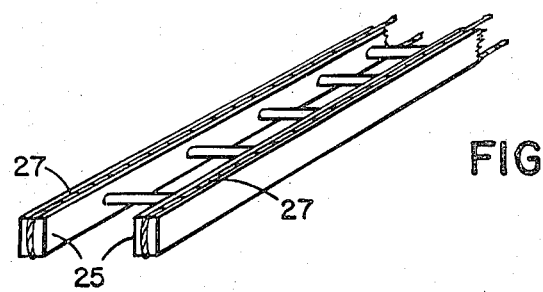
FIG 5
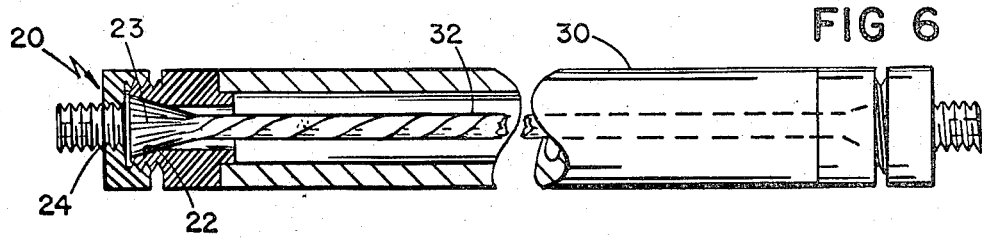
FIG 6

PRESTRESSED ELEMENTS

This application is a division of our application Ser. No. 48,165, filed June 22, 1970, now U.S. Pat. No. 3,631,897 which was a continuation-in-part of our application Ser. No. 856,901, filed Sept. 4, 1969, now U.S. Pat. No. 3,533,203 which was a continuation of Ser. No. 617,583, filed Feb. 21, 1967, now abandoned, which was in turn a continuation-in-part of our applications Ser. No. 388,416, filed Aug. 10, 1964, now U.S. Pat. No. 3,208,838; Ser. No. 464,309, filed June 16, 1965, now U.S. Pat. No. 3,431,687, and Ser. No. 567,540, filed July 25, 1966, now abandoned.

The invention relates to novel prestressed elements and methods of their manufacture.

As has long been in the art, prestressing, by maintaining a structural member in a precompressed condition may be utilized to increase its tensile strength and its strength in bending. For example, concrete, a cast stone made primarily of portland cement, aggregate and water, has the property of great strength in compression. Unfortunately, though, it is weak in tension, causing it to be brittle and so subject to cracking and breakage when subjected to unexpected tension stresses, such as frequently occur in handling and assembling precast concrete elements prior to and during building construction.

There have been used two ways of attempting to overcome this weakness of concrete in tension; one is to reinforce; the other is to precompress by prestressing.

Reinforcing, however, has the distinct drawback in that it still permits the concrete to crack under tension, although the steel reinforcing continues to hold the cracked pieces generally together. This is because the steel reinforcing must elongate as it takes up the load, but, because the elongation is more than the encasing concrete can stand, it cracks under the load.

Prestressing is largely a matter of precompressing the concrete element in those areas where tension stresses are anticipated. If enough precompression is stored up in the concrete element, there will be no tensile stresses under the design load. Under these conditions, the concrete, being under compression, loses its brittleness and behaves as a flexible and resilient material. A prestressed concrete element merely loses some of its precompression as it accepts its load, so that the actual compression stresses are reduced as the load increases, at least up to the design load.

With other relatively rigid, that is relatively incompressible materials, such as metals, synthetic plastics including fiberglass-resin composites, wood, glass, etc., precompressing is also known to be highly useful in increasing their tensile strengths, and is particularly useful insofar as bending of structural members is concerned.

In practice, prestressing of concrete, for example, has been accomplished in two ways; post-tensioning and pre-tensioning. In either case, a steel rod or cable is tensioned to compress the concrete. With post-tensioning, such is accomplished by casting a hole in the concrete element, and, after the concrete has set, placing a steel rod or cable through the hole and tensioning it to compress the concrete, leaving the tensioning elements exposed at the ends of the hole. With pre-tensioning, a steel cable is tensioned as by hydraulic jacks and end anchors and the concrete poured around the steel while it is maintained in tension. After curing, the concrete will bond to the steel cable by reason of the grooves therein so that the end anchors can be cut off, the steel remaining in tension to maintain the surrounding concrete in compression and so prestress it.

Although this latter method of prestressing has met with considerable success over more than a decade, it is still subject to a number of disadvantages.

From the standpoint of quality, particularly as to crack control in precast concrete elements, because of the low elongation of steel, (for example, a ½ inch diameter ASTM grade 7 wire uncoated will only elongate about three-fourths inch in 10 feet at 25,000 pounds tension), it is most difficult to achieve the optimum degree of prestressing, because of slipping of the steel within the concrete element, resulting in crack development at much lower tension stresses than anticipated. Too, since it is necessary to use steel cable of the order of about one-half inch in order to achieve satisfactory bonding to the concrete, and to equate the steel tension with respect to the compressive strength of the concrete, distribution of the prestress throughout the cross-sectional area of the element by utilizing multiple steel cables cannot be effected except in the largest sizes of elements. In addition, the ends of the steel prestressing elements necessarily remain exposed on the outer surface of the element.

Furthermore, from the standpoint of usability, such prestressing is restricted to use with relatively high strength concrete, and cannot be used, for example, with light weight, low strength foamed concrete such as is commonly used in building facing elements. This is both because of the low elongation of steel even at high tensile stresses and the impossibility of bonding small diameter steel rod or cable to the foamed concrete element which makes it impossible to provide a steel prestressing element of suitably low tension to equate with low strength concrete.

From the standpoint of manufacturing difficulties, expensive equipment is needed to create the high steel tension needed, and to maintain it during the time necessary for the concrete to cure. For this reason, heretofore, prestressed concrete elements could be economically manufactured only at central locations and trucked to the construction site, and their range of sizes and configurations was limited by the cost and availability of such equipment, especially when but a few of a particular concrete element was involved.

Other materials, such as synthetic organic plastic materials, have similarly been prestressed by incorporating therein stressed, relatively inextensible elements, but all were subject to the same difficulties enumerated above, namely, the practical difficulty in achieving optimum prestressing because of the low elongation of the prestressing elements, even when they are under high tension and the resulting inability to utilize them, particularly with low strength structural elements, especially of light weight materials such as wood and plastic.

Accordingly, the major object of the present invention is to provide novel prestressed elements and methods of manufacturing same not subject to the above-mentioned difficulties.

Other objects of the invention are to make possible the prestressing of light weight, low strength elements, as well as the distribution of tensioning stresses throughout the element cross section, even with low strength materials.

Another object of the invention is to make possible the concealing of the reinforcing strands within the elements, so that they are not exposed on the surface thereof.

Another object of the invention is to avoid the use of metal pretensioning elements with their known electrolytic and corrosion problems.

These and still further objects of the invention have been accomplished by our discovery of the unique utility as pretensioning elements of a class of materials long known in other uses but never heretofore considered to be practical as pretensioning elements. These material comprise well-known synthetic organic plastic polymers, such as nylon, polypropylene, and polyester, preferably in the form of highly elastic multi-filament strands, twisted or untwisted, of moderate tensile strength as compared to steel, but uniquely capable of producing high compressive forces due to their high recoverable stretch or elongation, upwards of 10 to 20 percent, providing progressively increasing tension up to their breaking tension at their elastic limit. We have found that such multi-filament strands, when stretched at least 5 to 10 percent of their stable relaxed length to as much as 80 to 90 percent of their elastic limit at break, may be combined with relatively rigid materials, especially such light weight materials as light metals, plastic, wood, etc., capable of maintaining the tensioned strand at a relatively fixed length at at least said 5 to 10 percent elongation, particularly as to further elongation, to provide unusually light weight pretensioned elements and articles. For example, ropes of such strands, stretched of the order of at least 10,000 to 15,000 and up to more than 35,000 p.s.i. (on the basis of rope cross section) may be used, as may be the strands themselves with breaking tenacities of 4 to 10 grams per denier, equivalent to fiber cross section p.s.i.'s of about 60,000 to 150,000, or higher.

Surprisingly, and contrary to what had been the general belief that the tension forces of such a stressed strand needed for producing the required compressive forces would decrease so rapidly with time as to make it useless for a relatively permanent pretensioning element, our tests have established that, after an initial force decay of 5 to 10 percent which occurs within a few minutes, further decay is apparently constant at approximately a logarithmic rate with time and occurs very slowly, such that nylon, for example, will apparently retain more than two-thirds of its initial tension for producing compressive force after 100 years. Thus, by prestressing a relatively rigid material by such a strand maintained at at least about 5 to 10 percent elongation and preferably under tension of at least about 10 to 20 percent of its ultimate breaking strength, at a tension of at least 50,000 p.s.i. (fiber basis), and preferably higher, a wide variety of uniquely prestressed structural elements may be provided according to the invention.

The decay factor referred to above may be determined by tests in which the filaments of the material to be tested are secured to the clamps of a tensile tester such that the unstretched, slack-free length of the sample is 10 inches (25.4 cm) prior to the application of a force. The sample is then stretched at a rate of 1 inch (2.5 cm) per minute to achieve either an increase in length of 15 percent or a length that is 1 percent less than the elongation at break, whichever is less. One minute after the filaments have been stretched to the desired length, the total stress on the filaments is recorded. The filaments are left undisturbed in the tester in the stretched state for 4,000 minutes. The stress value after this period of time is measured and recorded.

For the purpose of more fully explaining further objects and features of preferred embodiments of the invention, reference is now made to the following detailed descriptions thereof, together with the accompanying drawings, wherein:

FIGS. 1 and 2 are, respectively, plan and cross-sectional views of an internally prestressed structural element according to the invention;

FIGS. 3 and 4, are, respectively, side and cross-sectional views of an externally prestressed structural element according to the invention;

FIG. 5 shows a typical end product utilizing the structural element of FIGS. 3 and 4;

FIG. 6 shows an internally prestressed tubular structural element;

Figure 7:
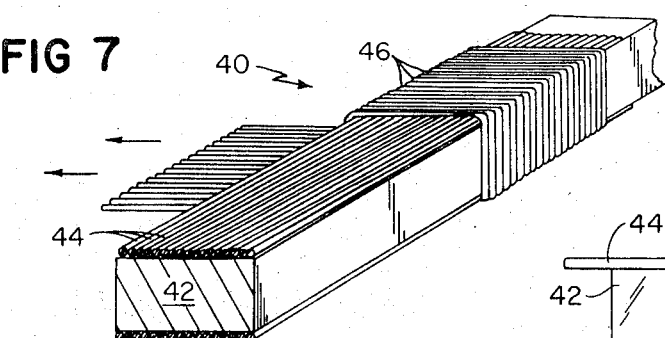
FIGS. 7 and 8 are, respectively, isometric and side views, partly broken away, of a solid structural element externally prestressed in two directions according to the invention.

In general, the preferred embodiments of the invention provide compressed structural elements such as those shown in the drawings by compressing elements of conventional rigid materials such as metal, plastic, concrete, wood, etc., by means of internal or external fiber tensioning strands capable of dimensional change such as potentially high elastic stretch, of the order of at least about 5 to 10 percent, relatively to that of the material to be prestressed, and with a decay rate of no more than about one-third over a period of years, with such strands being maintained at about 5 to 10 percent elongation in excess of their stabilized relaxed length and preferably under tension of at least about 10 to 20 percent of their ultimate breaking strength at a tension of at least 50,000 p.s.i. (fiber basis) and preferably higher. It is vital to the invention that the material to be prestressed be in a substantially rigid, non-yielding condition, that is, be relatively incompressible, when compressive forces are applied to it by the tensioning strand, so that the highly tensioned strand is in intimate contact with the rigid body and is maintained thereby at a relatively fixed length so that it continuously maintains its compressive force to prestress the element at a relatively low decay rate. The use of the non-metallic fiber tensioning strands of the invention avoids the electrolytic and corrosion problems of metal, and has still other advantages as hereinafter set forth.

A wide variety of elastically contractible organic plastic strands may be utilized according to the invention including such organic plastic materials as nylon, polypropylene, and polyester, for example, as well as others, preferably in multi-filament, untwisted or twisted configurations as with rope or rovings. Such strands have a usefully high tensile strength with a great amount of elastically recoverable extension, by which we mean that extension which repeatedly remains after the strand has been stretched a sufficient number of times to achieve a relatively stabilized relaxed length. For example, nylon rope, a preferred tensioning strand according to the invention, has a breaking strength of about 36,000 p.s.i. (rope cross section basis) at about 50 percent elongation beyond its stabilized length, and may be elongated to as much as 80 to 90 percent of its ultimate breaking elongation to provide a tension useful for producing prestressing compressive forces as high as about 30,000 p.s.i. at an elongation of about 40 percent, for example. On the basis of our tests and calculations, such a nylon rope, when maintained at a relatively fixed elongation of 40 percent by the rigid element to be prestressed, will still have a prestressing compression force of 20,000 p.s.i. even after 100 years. As another example, polyester multifilament yarn (DuPont "DACRON" Type 68) with a breaking tenacity of 9.5 gms/denier (166,000 p.s.i.) at 13.7 percent elongation is also highly useful, especially at high tensions of over 50,000 p.s.i. and maintains at least two-thirds of its applied tension over a period of years. Such materials are uniquely useful as prestressing elements, especially for prestressing relatively light-weight rigid elements as of wood, aluminum, plastic, glass, etc., as well as hollow elements and articles, such as grinding wheels, pressure vessels, pipe, etc., which are very difficult to prestress with a material such as steel because the high tensile strength of steel makes it necessary to utilize extremely small prestressing elements which are difficult to assemble and control. With the much lower tensile strengths and increased elongations of the prestressing materials of the present invention, much larger and hence easier to control prestressing elements may be successfully used, especially since, unlike steel with its maximum elongation of 1 to 2 percent, with the prestressing materials of the present invention, even a 10 percent decrease in their fixed tensioned length either by slippage or deformation of the structural member will result only in about a 10 percent loss in the compressive force applied.

Polyester and polypropylene ropes have somewhat lower breaking strengths, with elongations about half that of nylon, but are nevertheless highly useful in the practice of the invention. Other plastic materials with similar physical properties are also useful.

Whatever its exact nature, the potentially contractible tensioning strand of the invention, as set forth in our earliest application Ser. No. 388,416, now U.S. Pat. No. 3,208,838, may be incorporated with a non-rigid material such as unset concrete or plastic, while the concrete or plastic is in unset, yieldable condition usually by pouring it into or compressing it within a suitable form in which the tensioning strands are supported, after which the non-rigid body is allowed to set to a rigid condition and the tensioning strands then contracted or allowed to contract to compress the element. Or the tensioning strand may be applied in tensioned condition externally of a rigid element to be compressively stressed with the tensioning strand in intimate contact therewith so that the stressed reinforcing element dimensionally changes to compressively stress such element.

The stressing of the tensioning strand after the previously non-rigid body has sufficiently set may be accomplished on a temperature basis. For example, as conventional practice, the curing of precast concrete elements is carried out by heating the form containing the concrete. Utilizing the invention, a tensioning strand can be selected in which a major proportion of its contraction occurs at a suitable temperature, below which the concrete cure can be initially carried out for substantial setting and bonding to the tensioning strand and above which the tensioning strand will shrink to tension it and so compress the concrete element.

The invention may be applied to concrete made of portland cement, using a wide variety of aggregates, as presently known to the art, not only the usual sand, gravel and stone aggregates, but also light weight aggregates such as burnt clay, expanded blast furnace slag, pumice and expanded vermiculate, as well as air-entrained and foamed concrete.

In FIGS. 1 and 2 is shown a standard concrete test element (ASTM) generally designated 10 constructed according to the invention. Specifically, such a test specimen has a 6 inch square cross section and is 21 inches long, and was produced by incorporating tensioning elements 12, 14, 16, 18 within a normal portland cement concrete having a strength in the range of 5,000 to 6,000 p.s.i. compressive strength, as is known in the art and described, for example, in Design and Control of Concrete Mixtures, tenth Ed., published by Portland Cement Association (1952).

As specifically shown in FIGS. 1 and 2, the tensioning elements 12, 14, 16, 18 are multi-filament, heat-shrinkable polyester fibers having a recoverable stretch of about 10 percent, in which about a 10 percent shrinkage occurs upon heating to a temperature of about 300°. This may be done by incorporating such fibers in the form of rovings, appropriately arranged in the unset cement body and then setting the cement at a lower temperature than that effective to cause substantial shrinkage of the polyester fibers. Thereafter, the concrete body is heated to a temperature sufficiently high to cause the polyester fibers to contract. A test specimen so made had a breaking strength approximately twice that of a control specimen without such fibers and exhibited most desirable crack control characteristics, in that cracks appeared well in advance of breakage, which cracks could be made to disappear by unloading the specimen. Other contractible fibers than polyester can be used as well, and such fibers may be arranged in the form of rope as well as rovings.

Precompressed structural elements may also be produced by using organic plastic multi-fiber strands, such as ropes, of the type described above which are capable of at least about 5 to 10 percent elongation and elastic recovery under tension of at least about 10 to 20 percent of their ultimate breaking strength. This may be accomplished by tensioning one or more such ropes, for example, of nylon, and holding each by appropriate clamps 20, such as are shown and described with reference to FIG. 6, pouring the concrete or other unset plastic body around the tensioned ropes, and allowing it to set while maintaining the ropes under tension. After the concrete has set, the tension on the ropes may be released to compress the concrete and the ends of the ropes may be cut off. Nylon ropes are particularly desirable in such application, not only because of their great elongation and the high compressive forces produced thereby, but also because they appear to react chemically with the concrete for firm bonding thereto.

As still another modification of the internally tensioned compressed structural element of FIGS. 1 and 2, the body 10, regardless of the rigid material of which it is composed, may be stressed according to the invention by passing ropes 12, 14, 16, 18 through appropriate holes therein, tensioning said ropes to a condition equivalent to at least about 5 to 10 percent in excess of their stabilized relaxed length and under tension of at least about 10 to 20 percent of their ultimate breaking strength, and so maintaining them at a fixed length relatively to body 10 as by clamps 20.

In FIGS. 3 and 4 is shown an externally stressed structural member according to the invention in which a rigid body 25, as of metal, wood or plastic, is stressed by a tensioned strand 27 wrapped therearound, which may be in the form of, for example, an endless rope, roving or multiple turn-wound multi-filament strand. As before, strand 27 is of an extensible material pretensioned to at least about 5 to 10 percent in excess of its stable relaxed length and to a tension of at least about 10 to 20 percent of its breaking tension. As required by its use, strand 27 need not wrap the body 25, but may extend along one or both sides thereof and be attached adjacent its ends by any suitable means such as clamps 20.

In FIG. 5 is shown a typical end product using the structural elements of FIGS. 3 and 4 as the side rails 32,34 of an otherwise conventional ladder 30 having rungs 36. The ladder material is of hardwood although aluminum could be used as well. Strand 27 is of nylon rope of ¼ inch diameter, extended to 40 percent of its stabilized relaxed length to develop a residual compressive force of about 700 pounds, about one-third of its ultimate breaking strength and is retained in a groove about the periphery of the side rails. By thus prestressing with about 2 ounces of nylon on each side rail, a 12 foot length of ladder broke, when horizontally supported at its ends and loaded at its center, at 1,280 pounds, as compared to a similar ladder without a compressing strand 27 which broke at 580 pounds.

In FIG. 6 is shown another structural member in the form of an aluminum tube 30 having a strand 32 elongated and stressed according to the invention passing through its center and held at its ends by known clamps, generally designated 20, having a conical body 22 for receiving the opened end of the multi-fiber strand 32 and clamping it by cooperation with a conical plug 23 held in position in body 22 by screw threads 24. The internally stressed, tubular structural member of FIG. 6 is useful in a wide variety of end products, including supporting poles of many types including boat masts and ski poles, as well as for such highly stressed and flexible elements as helicopter rotor blades.

Figure 8:
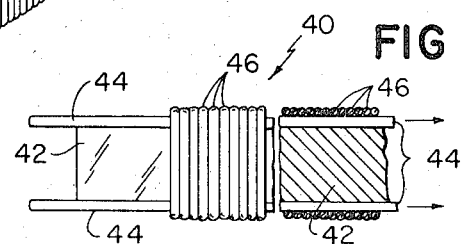

In FIGS. 7 and 8 is shown a rigid structural member, generally designated 40, having a smooth outer surface, which has been stressed in two directions, both longitudinally along its axis, and wrapped circumferentially transversely generally perpendicular thereto with its adjacent turns in contact with one another, all as shown in said figures, to provide improved strength characteristics with improved resistance to bending deformation, especially with lightweight materials. To this end, the rigid body 42, which may be of wood, metal, plastic, including fiberglass-resin composites, concrete, glass or the like has a plurality of tensioned longitudinally extending high tenacity organic plastic strands 44 preferably of nylon or polyester, positioned along one or more sides thereof, or therewithin, and maintained at an elongation of at least 5 percent under tension of greater than 50,000 p.s.i. while the member and strands 44 are overwrapped by tensioned circumferential strands, again at an elongation of at least 5 percent and a tension of greater than 50,000 p.s.i. preferably in sheet form in helical configuration. After strands 44 have been wrapped and secured by any suitable means, the underlying longitudinally extending strands 44 may be released and trimmed as desired, their tension being maintained by the overwrapped strands 46. The wrapping of the circumferentially extending strands may best be accomplished by simultaneously wrapping a plurality of strands, preferably in single layer sheet form, under tension sufficiently high to produce a tension exceeding 50,000 p.s.i. in the finished filaments.

Structural members of this type have a wide variety of uses, for example, ladder side rails are especially adapted to be so reinforced, as are other articles, particularly those subject to great abuse, such as hockey sticks or baseball bats in which the handle portion may advantageously be so reinforced.

Another class of articles which may be advantageously reinforced according to the invention comprises internally pressurized articles, such as pressure vessels, tanks, pipes, and the like.

Figure 9:
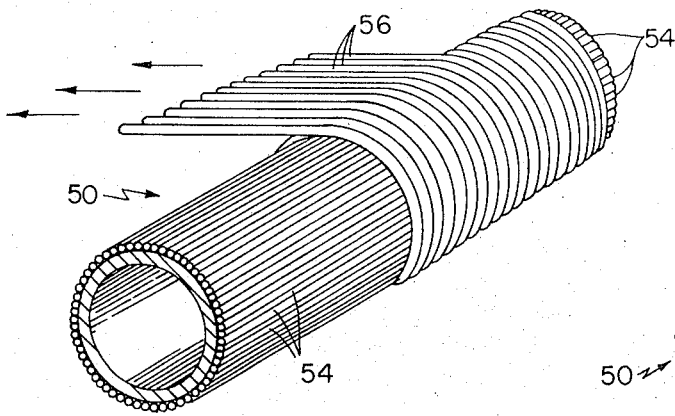
FIGS. 9 and 10 are, respectively, an isometric view, partly broken away, and an end view of a pressure vessel externally prestressed in two directions according to the invention.
Figure 10:
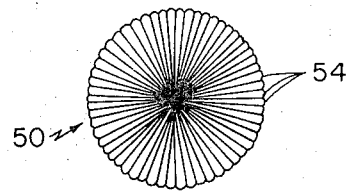

Thus, in FIGS. 9 and 10 is shown a pressure vessel, generally designated 50, having a hollow cylindrical rigid body 52 having a smooth outer surface with hemispherical ends wrapped with an underlying plurality of longitudinally extending strands 54 around the ends thereof and a plurality of circumferentially transversely extending strands 56 around the central cylindrical portion thereof with their adjacent turns in contact with one another, as shown in said figures, much as the rectangular solid structure of FIGS. 7 and 8. With the pressure vessel of FIGS. 9 and 10, however, the longitudinally extending strands are preferably distributed around the circumference thereof, and cross at the center of its hemispherical ends, as best shown in FIG. 10, to provide a unique reinforcement to said ends. Body 50 may be of any desired material, such as metal, plastic, concrete glass or the like.

Particularly advantageous results have been obtained by wrapping elongated strands of a synthetic organic fibrous material around the axial extent of the outer surface of a hollow, cylindrical article, such as pipe, wherein each strand comprises a multiplicity of filaments and which is commercially marketed as a yarn. As described below, significant advantages such as increased crush and burst strength and added impact resistance have been obtained. These advantages are gained with a pipe body of any material provided it has the aforementioned characteristic of being able to resist being critically deformed by the forces exerted on the wall of the pipe by the elongated strands, but especially unexpected results have been obtained with pipes of materials made from slurrys, that is, mixtures of solid particulate or fibrous materials and liquids thereafter treated to dry or set them, such as concrete, clay, asbestos-cement, or even wood pulp. As described previously, the synthetic strands may include such organic plastic fibrous materials, as nylon, polypropylene, and polyester as well as others, preferably in mono- or multi-filaments of untwisted or twisted configurations, as with the articles of FIGS. 7 through 10. Also, the foregoing statements that such strands while in position around the pipe are elongated at least 5 percent greater than their stable relaxed length to a tension of at least 50,000 p.s.i. (fiber basis) must be present to obtain these advantageous results.

Figure 11:
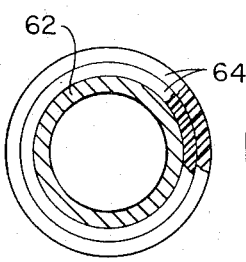
FIG. 11 is a cross sectional view of an externally prestressed pipe according to the invention.

In FIG. 11, there is illustrated a composite structure generally designated 60, including a pipe body 62 having a strand or yarn 64 circumferentially wrapped around its outer surface. It is understood that the material wrapped around the pipe may comprise a single strand or a plurality of strands. In any event, each strand comprises a plastic material having a recoverable stretch at least about 5 to 10 percent and having a tensile strength in excess of 100,000 p.s.i. (fiber basis) and was subjected to sufficient force as it was wrapped circumferentially around the pipe body 62 so that in its position around the pipe it had been elongated to a length 8 percent greater than its stable relaxed length. In this particular illustration, there are two layers of the overwrapped strands 64 but it is recognized that the number of layers of the overwrapped strands depends only on the final desired characteristic in the pipe and the amount of synthetic material in the layers. While FIG. 11 illustrates particularly a section of pipe, it is within the scope of this invention that the advantageous results are also obtained by overwrapping similar objects used with pipe such as couplings, tees, els and bends.

The following chart illustrates the advantages to be gained by following the concepts of this invention as applied to pipe. Although specific materials, pipe sizes, and elongated strands are set forth in these examples, it is understood that this is done for illustration purposes only and in no way affects the scope of the claims.

In Example A of the above chart, the A-C sewer pipe comprised 8 inch asbestos-cement pipe of the type marketed by Johns-Manville under the trade designation 8 inch Class 1500 Sewer Pipe.

In Example B, the A-C coupling comprised 6 inch asbestos-cement pipe coupling of the type marketed by Johns-Manville under the trade designation 6 inch Class 150 Pressure Pipe Coupling.

In Example C, the PVC pipe comprised a polyvinyl chloride pipe of the type marketed by Johns-Manville under the trade designation 160 p.s.i. 6 inch PVC pipe.

In Example D, the concrete pipe was of the type marketed by N. E. Concrete Pipe Co. under the trade designation 8 inch Type C-14-68.

In Example E, the clay pipe was of the type marketed by Brockway Pipe Co. under the trade designation 8 inch, C-200 ES.

In the wrapped Examples of FIG. 11, as well as the articles of FIGS. 7 through 10, the pipe, coupling or other article was wrapped with a polyester strand yarn of the type marketed by E. I. duPont de Nemours and Company as DACRON filament yarn for industrial use, Type 68, 1300 Denier, 192 filaments high strength, with a breaking tenacity, gms/den of 9.5, equivalent to 166,000 p.s.i. (filament basis) with elongation at break of about 14 percent. In those examples indicating a number of layers of yarn, each layer of yarn was formed by wrapping strands of Type 68 yarn around the entire axial extent of the pipe so that there were about 34 strands per inch in an axial direction with each layer having a radial thickness of about 0.01 inches. Each strand of the yarn was formed by approximately 192 filaments of the polyester fiber. A force of about 18 pounds (67 percent of its breaking strength of 27 pounds) was applied to each strand of the yarn as it was wrapped circumferentially around the outer suface of each piece of pipe or coupling so that each strand was elongated about 10 percent greater than its stable relaxed length.

| Example | Hydrostatic no impact | Impact | Hydrostatic after impact | Crush no impact |
|---|---|---|---|---|
| | p.s.i. | ft.-lbs. | p.s.i. | lbs. |
| A1. A-C sewer pipe | 320 | 40 | 220 | 3430 |
| 2. A-C sewer pipe (1 layer) | 740 | 40 | 730 | 5500 |
| 3. A-C sewer pipe (3 layer) | 1540 | 40 | 1350 | 11,700 |
| B1. A-C coupling | 805 | 20 | 410 | 3820 |
| 2. A-C coupling (3 layer) | 1650 | 20 | 1650 | 11,400 |
| C1. PVC pipe* | 640 | 100 | 660 | |
| 2. PVC pipe (1 layer) | 1600 | 100 | 1520 | |
| 3. PVC pipe (3 layer) | 2400** | 100 | 2900 | |
| D1. Concrete pipe | 130 | 20 | 10 | 1720 |
| 2. Concrete pipe (3 layer) | 740 | 20 | 550 | 17,000 |
| E1. Clay pipe | 160 | 6.7 | 0 | 2180 |
| 2. Clay pipe (1 layer) | 440 | 6.7 | 440 | 7100 |
| 3. Clay pipe (3 layer) | 790 | 6.7 | 660 | 16,600 |

*Crush not applicable
**Pipe did not break

In the preferred embodiment, each layer is formed by rotatably mounting pipe in a lathe. As the pipe is rotated, a plurality of strands of the yarn are subjected to a suitable tensioning device which functions to apply sufficient force to the strands so that they are elongated the desired amount. The strands as illustrated are wrapped around the pipe in a helical pattern and extend from one extremity thereof to the other extremity. If a plurality of layers are wrapped around the pipe, they are preferably formed so that the direction of the helix changes in successive layers. The pipe must have sufficient structural rigidity so as to be able to withstand the forces being generated by the strands wrapped therearound. In the foregoing examples, each strand was subjected to forces in excess of 100,000 p.s.i. (filament basis) as it was positioned around the pipe. While the amount of force applied to the yarn will vary relative to the synthetic material being used and the amount of elongation desired, it has been found that, to obtain the above advantageous result, this force should exceed 50,000 p.s.i.

The increase in pipe strength both as to internal hydrostatic pressure and crush are particularly striking and are believed to be due to stress transfer provided by the overwrap of highly stressed and extended fibers according to the invention, to the extent that small weak areas of the pipe body which would normally prove to be a focal point for failure, are uniquely strengthened by the invention so that such failure does not occur. For this reason, pipe having imperfections that would normally cause it to be rejected can be salvaged by the use of the invention.

Another type of article which may be particularly advantageously prestressed according to the invention comprises abrasive grinding wheels of the hollow cylindrical or cup type which may be externally prestressed according to the invention to provide increased strength so that they may be rotated at higher speeds, yet with increased safety.

In the grinding wheel art, it is known that grinding efficiencies increase generally in proportion to the speed of the wheel surface, so that it is important to rotate a grinding wheel at a high speed for maximum grinding efficiency. However, the maximum wheel speed is limited by wheel strength, since centrifugal forces which the wheel must resist without breaking up increase rapidly with increasing wheel speed.

In our earlier U.S. Pat. No. 3,141,271, there was shown and described grinding wheel reinforcements in the form of prestressed inextensible glass fibers, which were effective in increasing grinding wheel speeds to a limited extent, but were highly successful in providing the highly desirable safety feature of holding the pieces of the grinding wheel together after partial failures and cracks had occurred in the wheel, so that the wheel did not break up and throw pieces with the resulting possibility of serious personal injury.

The present invention, as applied to grinding wheels of the cylinder or cup type, is an improvement thereover, not only in the increased prestress to give unexpectedly higher speeds, but also in the simplicity of utilization of the invention with existing types of hollow grinding wheels. In addition, as with other materials made from slurry-like mixtures, the grinding wheels according to the present invention are uniquely strengthened insofar as imperfections are concerned.

Figure 12:
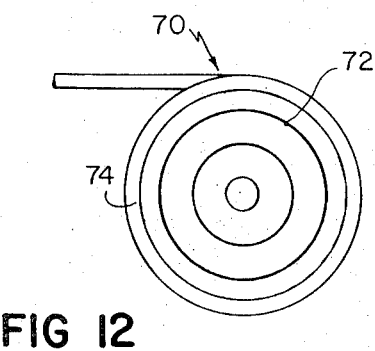
FIGS. 12 and 13 are, respectively, an end and a side view, partly broken away, of an externally prestressed grinding wheel according to the invention.
Figure 13:
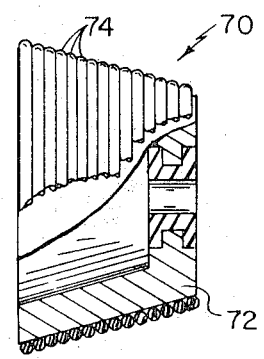

Thus, in FIGS. 12 and 13, there is shown a grinding wheel, generally designated 70, of the hollow cylindrical or cup type having a conventional rigid body 72 composed of abrasive grains or particles in a resin binder with a strand or yarn 74 circumferentially wrapped around its outer surface. As with the pipe of FIG. 11, the strand comprises a plastic material having a recoverable stretch of at least about 5 to 10 percent and having a tensile strength in excess of 100,000 p.s.i. and was subjected to sufficient force as it was wrapped circumferentially around the body 72 so that in its position around the body it had been elongated to a length about 5 to 10 percent greater than its stable relaxed length. In this particular illustration, the overwrapped strands 74 are the same as those referred to in FIG. 11.

The advantages to be gained by following the concepts of this invention as applied to hollow cylindrical or cup type grinding wheels, whether actually having cylindrical or frusto-conical outer surfaces, wound with a single layer of the polyester yarn and in the manner referred to in connection with the above pipe examples, in addition to safety, are of surprisingly increased surface speeds, of the order of double over those of wheels not reinforced according to the invention. Although specific grinding wheels and elongated strands are set forth herein, it is understood that this is done only for purpose of illustration.

The great strength and recoverable elongation of strands and ropes of synethetic organic plastic fibers, over 50 percent before breakage for nylon and about 20 percent for polypropylene and for polyester such as DACRON, their great contractive force even at such relatively low elongations of about 10 percent in excess of their stabilized relaxed length, (and what has proved to be their unexpectedly low rate of decay of no more than about one-third of their stretched compressive force over a period of many years) make them uniquely suitable for use as pretensioning elements, since their uniquely high elongations are achieved at far lower tensile stresses than steel or glass fiber strands. For example, a one-half inch nylon or DACRON rope can be so elongated to about 10 percent in excess of its stabilized relaxed length with about a 4,000 to 5,000 pound force as compared to a force five times higher needed to stretch a one-half inch steel cable about 1 percent. This not only makes it possible to use simpler and cheaper prestressing machinery, but also at the same time to produce a more uniformly stressed product even of lightweight concrete, wood or aluminum, for example, and to distribute the stress throughout the element cross section by utilizing multiple strands as desired. This is because, with the high degree of elongation provided by such organic plastic fiber ropes, slippage of the tensioning element relatively to the rigid body to a minor degree is not a problem, whereas, at the low elongations of steel, even minor slippage will destroy the tensioning effect of the steel. Any required amount of pretensioning may be provided according to the invention by increasing the number of organic plastic fiber strands, and slippage may be virtually eliminated by coating the strands with a suitable adhesive such as an epoxy resin to provide any desired degree of bonding to maintain the tensioning strands in intimate contact with the body.

We claim:

1. A hockey stick comprising:

a rigid body having a smooth outer surface, a plurality of longitudinally extending fibrous strands on at least a portion of the outer surface of said body a fibrous material, capable of being elongated to a length greater than its stable relaxed length and having a tendency to recover a substantial portion of such elongation, wrapped with its adjacent turns in contact with one another transversely around a portion of the outer surface of said body over said fibrous strands said fibrous material around said outer surface of said body over said fibrous strands being elongated to a length greater than its stable relaxed length, and means fixing said fibrous material in its elongated condition around said body with said fibrous material after a substantial period of time being in tension in an amount of at least 10 percent of the ultimate breaking strength of said fibrous material and in an amount of at least 50,000 p.s.i. on a fiber basis.

2. A hockey stick as claimed in claim 1 wherein:
said hockey stick is of wood.

3. A hockey stick as claimed in claim 1 wherein:
said fibrous material in position around said outer surface of said body is elongated to a length at least 5 percent greater than its stable relaxed length.

4. A bat comprising:
a rigid body having a smooth outer surface, a plurality of longitudinally extending fibrous strands on at least a portion of the outer surface of said body a fibrous material capable of being elongated to a length greater than its stable relaxed length and having a tendency to recover a substantial portion of such elongation, wrapped with its adjacent turns in contact with one another transversely around the handle portion of the outer surface of said body over said fibrous strands, said fibrous material in position around said outer surface of said body over said fibrous strands being elongated to a length greater than its stable relaxed length, and means fixing said fibrous material in its elongated condition around said body with said fibrous material after a substantial period of time being in tension in an amount of at least 10 percent of the ultimate breaking strength of said fibrous material and in an amount of at least 50,000 p.s.i. on a fiber basis.

5. A bat as claimed in claim 4 wherein:
said body is of wood.

6. A bat as claimed in claim 4 wherein:
said fibrous material in position around said outer surface if elongated to a length at least 5 percent greater than its stable relaxed length.

7. A mast structure or the like comprising
a rigid tubular body having a smooth outer surface, a plurality of longitudinally extending fibrous strands on at least a portion of the outer surface of said body a fibrous material capable of being elongated to a length greater than its stable relaxed length and having a tendency to recover a substantial portion of such elongation, wrapped with its adjacent turns in contact with one another transversely around the outer surface of said body over said fibrous strands, said fibrous material in position around said outer surface of said body and over said fibrous strands being elongated to a length greater than its stable relaxed length, and means fixing said fibrous material in its elongated condition around said body with said fibrous material after a substantial period of time being in tension in an amount of at least 10 percent of the ultimate breaking strength of said fibrous material and in an amount of at least 50,000 p.s.i. on a fiber basis.

8. A mast structure or the like as claimed in claim 7 wherein:
said fibrous material in position around said outer surface is elongated to a length at least 5 percent greater than its stable relaxed length.

9. A hockey stick as claimed in claim 1, wherein said strands include
a fiberglass resin composite having a plurality of longitudinally extending fibrous strands on said body, said fibrous material being wrapped over said composite.

10. A bat as claimed in claim 4, wherein said strands include
a fiberglass resin composite having a plurality of longitudinally extending fibrous strands on said body, said fibrous material being wrapped over said composite.

11. A mast structure or the like as claimed in claim 7, wherein said strands include
a fiberglass resin composite having a plurality of longitudinally extending strands on said body,
said fibrous material being wrapped over said composite.

* * * * *